No. 770,709. PATENTED SEPT. 20, 1904.
E. BLUE & Q. HERNDON.
REPAIR LINK.
APPLICATION FILED FEB. 25, 1903. RENEWED FEB. 27, 1904.
NO MODEL.

Witnesses
Gladys L. Thompson.

Inventors
Edgar Blue.
Quintus Herndon
By
Attorneys

No. 770,709. Patented September 20, 1904.

UNITED STATES PATENT OFFICE.

EDGAR BLUE AND QUINTUS HERNDON, OF GARVIN, INDIAN TERRITORY.

REPAIR-LINK.

SPECIFICATION forming part of Letters Patent No. 770,709, dated September 20, 1904.

Application filed February 25, 1903. Renewed February 27, 1904. Serial No. 195,675. (No model.)

*To all whom it may concern:*

Be it known that we, EDGAR BLUE and QUINTUS HERNDON, citizens of the United States, residing at Garvin, Choctaw Nation, Indian Territory, have invented certain new and useful Improvements in Repair-Links, of which the following is a specification.

This invention relates to means for repairing chain belting of any character, providing a link of peculiar form which is adapted to be readily and quickly applied and removed and which, because of its extreme simplicity, is of consequent cheapness relative to cost of production.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1:
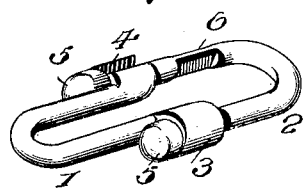
Figure 2:
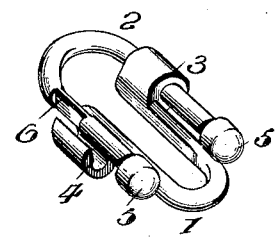
Figure 3:
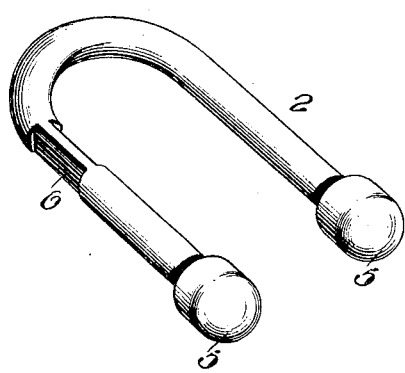
Figure 4:
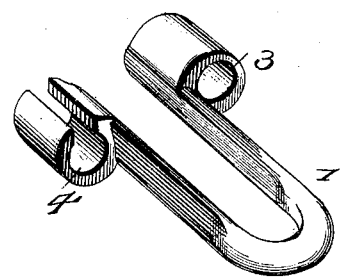

Figure 1 is a perspective view of the device, the parts being arranged as when in use. Fig. 2 is a perspective view showing the link members open. Fig. 3 is a perspective view of the pivoted link member. Fig. 4 is a view similar to Fig. 3 of the fixed link member.

Corresponding and like parts are referred to in the following description and indicated in all the views of the drawings by the same reference characters.

The link comprises companion members 1 and 2 of approximately U shape, said members being susceptible of a longitudinal movement, as well as adapted to be thrown open. For purposes of the description the member 1 will be designated as the "fixed" member and the coöperating member 2 as the "pivoted" member. The member 1, as before premised, is of U shape and has an eye 3 and hook 4 projected laterally therefrom and integral therewith. The said eye 3 and hook 4 are preferably disposed at the ends of the arms of the member. The pivoted member 2 has enlargements or heads 5 located at the ends of the side arms, and one of the aforesaid arms is cut away, as at 6, from opposite sides for purposes which will be apparent. The pivoted member is mounted for slidable movement with reference to the member 1, the eye 3 and hook 4 of the member 1 constituting bearings for the arms of said member in its movement. The cut-away portion 6 of the member 2 admits of disengagement of the arm of the member from the hook 4 in a manner which will be readily seen, and by a pivotal movement of same the link may be thrown open, as shown most clearly in Fig. 2 of the drawings.

It will be understood that the link may be used in various other ways from that mentioned, and by the simple structure of the link the use of rivet-fastenings and the like, which are easily breakable and disadvantageous for that reason, is obviated.

When the members of the link are extended, they are locked closed, it being only necessary to slide them together, and by a pivotal movement of the link 2 the cut-away portion thereof may be disengaged from the hook and the link thrown open.

While the primary intention is to provide a link for repair purposes, it is to be understood that same may be used for connecting trace-chains to swingletrees or to plow-stocks or wherever a lap-link is generally employed for connecting parts of harness or running-gear of vehicles and implements of any kind.

Having thus described the invention, what is claimed as new is—

1. In a link of the character described, the combination, of a relatively fixed member of approximately U shape provided with bearings, and a relatively movable member of approximately U shape having its arms received by the bearings of the relatively fixed member, and means disposed upon respective arms of the said members and coöperating to lock the same closed when extended and to permit opening thereof when forced together.

2. In a link of the character described, the combination, of relatively fixed and movable members of approximately U shape, bearings projected from the relatively fixed member to receive the arms of the relatively movable member, means provided upon one of the bearings of the fixed member, whereby the link is locked closed when the members are extended and whereby the relatively movable member may be given a pivotal movement to throw the link open when the said members are forced together.

3. In a link of the character described, the combination, of relatively fixed and movable members of approximately U shape, bearings projected from the relatively fixed member to receive the arms of the movable member, one of said bearings constituting a hook, and means disposed upon the arm of the movable member received by the said hook-bearing whereby when the members are extended the link will be locked closed and whereby when the members are forced together the link may be opened.

4. In a link, substantially as described, a relatively fixed member of approximately U shape, an integral eye projecting from one of the arms of said member and an integral hook from the other, a movable member of approximately U shape having its arms mounted for longitudinal movement within the eye and hook of the fixed member and having heads formed at the extremities of said arms, one of the arms of the movable member being cut away, whereby when the members of the link are forced together, the said arm by a pivotal movement of the member may be disengaged from the hook of the fixed member and the link thrown open, substantially as set forth.

In testimony whereof we affix our signatures in presence of two witnesses.

EDGAR BLUE. [L. S.]
QUINTUS HERNDON. [L. S.]

Witnesses:
J. W. ADAIR,
R. W. HINDS.